US012612734B2

(12) United States Patent
Laine et al.

(10) Patent No.: US 12,612,734 B2
(45) Date of Patent: Apr. 28, 2026

---

(54) COMPOSITION FOR PROVIDING BARRIER PROPERTIES, ITS USE AND A SHEET-LIKE PRODUCT

(71) Applicant: KEMIRA OYJ, Helsinki (FI)

(72) Inventors: Jaana Laine, Espoo (FI); Kaisa Karisalmi, Espoo (FI)

(73) Assignee: KEMIRA OYJ, Helsinki (FI)

( * ) Notice: Subject to any disclaimer, the term of this patent is extended or adjusted under 35 U.S.C. 154(b) by 229 days.

(21) Appl. No.: 18/570,410

(22) PCT Filed: Jun. 16, 2022

(86) PCT No.: PCT/FI2022/050420
§ 371 (c)(1),
(2) Date: Dec. 14, 2023

(87) PCT Pub. No.: WO2022/263725
PCT Pub. Date: Dec. 22, 2022

(65) Prior Publication Data
US 2024/0287744 A1     Aug. 29, 2024

(30) Foreign Application Priority Data
Jun. 17, 2021    (FI) ..................................... 20215715

(51) Int. Cl.
| | |
|---|---|
| *D21H 19/52* | (2006.01) |
| *C09D 7/40* | (2018.01) |
| *C09D 7/65* | (2018.01) |
| *C09D 125/14* | (2006.01) |
| *C09D 133/04* | (2006.01) |
| *C09D 197/02* | (2006.01) |
| *D21H 19/42* | (2006.01) |
| *D21H 19/58* | (2006.01) |
| *D21H 21/10* | (2006.01) |
| *D21H 21/16* | (2006.01) |
| *D21H 27/10* | (2006.01) |

(52) U.S. Cl.
CPC .............. *D21H 19/42* (2013.01); *C09D 7/65* (2018.01); *C09D 7/69* (2018.01); *C09D 7/70* (2018.01); *C09D 125/14* (2013.01); *C09D 133/04* (2013.01); *C09D 197/02* (2013.01); *D21H 19/52* (2013.01); *D21H 19/58* (2013.01); *D21H 21/16* (2013.01); *D21H 27/10* (2013.01)

(58) Field of Classification Search
None
See application file for complete search history.

(56) References Cited

U.S. PATENT DOCUMENTS

| | | | |
|---|---|---|---|
| 5,964,983 A | 10/1999 | Dinand et al. | |
| 2013/0209772 A1 | 8/2013 | Sandstrom et al. | |
| 2017/0306562 A1* | 10/2017 | Phipps ..................... | D04H 1/54 |
| 2019/0062562 A1 | 2/2019 | Van Engelen et al. | |

FOREIGN PATENT DOCUMENTS

| | | |
|---|---|---|
| CN | 103025956 A | 4/2013 |
| CN | 104684935 A | 6/2015 |
| CN | 107799702 A | 3/2018 |
| CN | 110719979 A | 1/2020 |
| CN | 112626914 A | 4/2021 |
| EP | 2730698 A1 | 5/2014 |
| WO | 2012066308 A2 | 5/2012 |
| WO | 2018143149 A1 | 8/2018 |
| WO | 2019073370 A1 | 4/2019 |
| WO | 2019086673 A1 | 5/2019 |
| WO | 2020016424 A1 | 1/2020 |
| WO | 2020226485 A1 | 11/2020 |

OTHER PUBLICATIONS

International Search Report and Written Opinion in Application No. PCT/FI2022/050420, mailed Sep. 9, 2022, 15 pages.
Finnish Search Report in U.S. Appl. No. 20215715, dated Jan. 12, 2022, 2 pages.
Search Report for Chinese Patent Application No. 202280043143.3 dated on Aug. 8, 2025.

* cited by examiner

*Primary Examiner* — Sheeba Ahmed
(74) *Attorney, Agent, or Firm* — Meunier Carlin & Curfman LLC

(57) ABSTRACT

The invention relates to a composition for providing barrier properties for a cellulosic fibre web, such as paper, board or the like. The coating composition comprises microfibrillated non-wood biomass, having a particle size D90<250 μm and particle size D50<100 μm, which microfibrillated non-wood biomass comprises at least 5 weight-% of a hemicellulose fraction and/or pectin, calculated from the dry weight of the microfibrillated non-wood biomass; an auxiliary agent comprising at least one cellulose derivative, and/or a synthetic binding agent, such as polyvinyl alcohol or polystyrene acrylate copolymer.

12 Claims, No Drawings

COMPOSITION FOR PROVIDING BARRIER PROPERTIES, ITS USE AND A SHEET-LIKE PRODUCT

CROSS REFERENCES

This is a U.S. national stage application of international patent application number PCT/FI2022/050420 filed on 16 Jun. 2022 and claiming priority to Finnish national application 20215715, filed on 17 Jun. 2021.

FIELD OF INVENTION

The present invention relates to a coating composition for providing barrier properties, its use and a sheet-like product according to the preambles of the enclosed independent claims.

BACKGROUND

Different coatings can be applied on the surface of paper or board in order to improve the surface properties. For paper and board, which are used for packaging purposes, various barrier properties are often desired, as the packaging material should protect the packaged goods from contamination and/or from contact with the surrounding environment. The packaging material preferably also provides an effective barrier against any leakage to the surroundings from the goods inside the package. Paper and board with a barrier coating may provide protection against water, water vapour, grease and/or oxygen contact. The barrier requirements are especially stringent for packaging materials used for foodstuff and consumable liquids.

The recent explosion in e-commerce, even in relation to groceries and other foodstuff, the increase in ready-packed meals and take-away food consumption, has intensified the demand for improved packaging materials. Packaging materials providing proper protection and barrier properties may also reduce or completely prevent the damage and/or spoilage of the packaged goods, especially foodstuff, during transport and storage, which minimises the losses in the chain from the production to the consumption. The growing awareness of the general importance of waste reduction, food waste reduction in particular, increases the need for packaging materials with enhanced barrier properties.

Conventionally, barrier properties for paper and board are obtained by coating them with coating compositions comprising synthetic petroleum-based polymers or by laminating a synthetic polymer film on the surface of the paper or board. However, the use of petroleum-based chemicals should be minimised due to their environmental impact, even in packaging material production. This means that there is a need in a packaging material industry to increase the amount of bio-based components in the coating compositions used for providing barrier properties for paper and board.

SUMMARY

An object of this invention is to minimise or possibly even eliminate the disadvantages existing in the prior art.

Another object of the present invention is to provide coating composition and a sheet-like product that comprise biobased raw material, and still provides appropriate barrier properties.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

A typical coating composition according to the present invention for providing barrier properties for a cellulosic fibre web, such as paper, board or the like, comprises microfibrillated non-wood biomass, having a particle size D90<250 nm and particle size D50<100 nm, which microfibrillated non-wood biomass comprises at least 5 weight-% of a hemicellulose fraction and/or pectin, calculated from the dry weight of the microfibrillated non-wood biomass;

an auxiliary agent comprising at least one cellulose derivative, and/or a synthetic binding agent, such as polyvinyl alcohol or polystyrene acrylate copolymer.

A typical use of a coating composition according to the present invention is for providing barrier properties for substrate comprising lignocellulosic and/or cellulosic fibres, such as paper, board or the like.

A typical sheet-like product according to present invention comprises a substrate comprising lignocellulosic and/or cellulosic fibres, and having a first and second parallel large surface, and barrier coating layer formed with a coating composition according to the present invention applied on at least one the surfaces of the substrate.

DETAILED DESCRIPTION OF THE INVENTION

Now it has been surprisingly found that a coating composition comprising microfibrillated non-wood biomass can provide desire barrier properties for the coating to be formed on a fibrous substrate. This makes it possible to significantly increase the amount of bio-based materials in the coating composition, even on a level >50%, without compromising the barrier properties obtained. The invention makes it also possible to use natural resources more efficiently, especially when agricultural residues are used for the microfibrillated non-wood biomass production. The barrier properties obtainable with the present coating composition are at least at the same level than when wood-based microfibrillated cellulose is used, often even better.

The coating composition according to the present invention comprises microfibrillated non-wood biomass. According to one embodiment the coating composition may comprise 20-60 weight-%, preferably 30-55 weight-%, more preferably 35-50 weight-%, of the microfibrillated non-wood biomass, calculated from dry solids content of the composition. This means that the present invention enables to use a high amount of renewable bio-based material in the coating composition, while maintaining the barrier properties on an appropriate or even improved level.

The microfibrillated non-wood biomass suitable for use in the present invention may originate from agricultural biomass, such as vegetables, fruits, grasses, cereals, pseudocereals, legumes or any combination thereof. For example, the microfibrillated non-wood cellulose may originate from one or more of the following; vegetables selected from sugar beet, beetroot, potato, cassava, sweet potato, carrot, parsnip, radish or any mixtures thereof; fruits selected from apple, pear, tomato, cranberry, blueberry, citrus fruits, such as orange, lime, lemon, grapefruit, or any mixtures thereof;

grasses selected from maize, wheat, oat, rye, barley, sugar cane, sorghum or any mixtures thereof; pseudocereals selected from amaranth, quinoa, buckwheat or any mixtures thereof; legumes selected from plants of the family *Fabaceae* (or *Leguminosae*), such as alfalfa, clover, different species of peas, different species of beans, such as soybeans, *Vicia fabas*, lentils, lupins, and any mixtures thereof. Preferably the microfibrillated non-wood biomass originates from vegetables and/or grasses, more preferably from sugar beet, potato, beet root, carrot, sugar cane and/or corn, especially sugar beet. The sources for suitable non-wood biomass are readily available, even in large quantities, and their production does not require logging of trees.

According to one aspect, the invention relates to the use of microfibrillar cellulose produced from agricultural non-wood biomass, which is a by-product, a side stream or a residual product from harvesting, food or beverage industry, sugar industry and/or starch industry for manufacture of barrier coating composition for sheet-like substrates comprising lignocellulosic and/or cellulosic fibres.

According to one preferable embodiment the microfibrillated non-wood biomass originates from agricultural non-food biomass, which may be, for example, a by-product, a side stream or a residual product from harvesting, food or beverage industry, sugar industry and/or starch industry. The microfibrillated non-wood biomass may originate, for example, from bagasse, citrus peel or potato peel. When the non-wood biomass originates from agricultural biomass, which is unsuitable for food or feed, and preferably a by-product or a residual product, it is possible to improve the efficiency of the cultivation, as the grown crops can be utilized in a higher degree.

The microfibrillated non-wood biomass may originate from pith, such as bagasse pith, sugar cane pith, corn pith, bamboo pith or any mixtures thereof.

The microfibrillated non-wood biomass preferably comprises microfibrillated parenchymal cellulose. The microfibrillated non-wood biomass thus may comprise parenchymal cellulose fibrils originating from primary cell wall structures, i.e. parenchymal cells. Parenchyma is here understood as basic tissue of plants, containing cells with thin primary cell walls. The cortex and pith of the stem, the internal layers of leaves, and the soft parts of fruits and vegetables are made of parenchyma. Parenchyma cells remain alive at maturity, and perform various functions, such as water storage, replacement of damaged tissue, and physical support of plant structures. Microfibrillated non-wood biomass may comprise parenchymal cellulose microfibrils or parenchymal cellulose microfibril bundles. Microfibrillated non-wood biomass can be obtained by grinding, refining and/or homogenising suitable raw materials. Grinding, refining and/or homogenisation may be performed by using a grinder, comminutor, rotor-stator mixer, homogenizer, micro- or microfluidizer, preferably without any preceding treatment steps of the raw material, such as enzymatic modification, chemical modification, or physical modification of the raw material. The length of the non-wood biomass microfibrils may be $\geq 1$ µm, for example 1-500 µm, preferably 10-300 µm, and the number-average diameter of the non-wood biomass microfibrils may be <200 nm, for example 2-100 nm.

The microfibrillated non-wood biomass used in the coating composition has a particle size D90 of <250 nm, preferably <200 nm, more preferably <150 nm, and a particle size D50 of <100 nm, preferably <70 nm, more preferably <50 nm. Particle size measurements can be performed by using Malvern Particle Size Analyzer based on laser technology. Preferably the particle size distribution of the microfibrillated non-wood biomass is unimodal.

The parenchymal cellulose content in the microfibrillated non-wood biomass may be at least 10 weight-%, preferably at least 20 weight-%, calculated from the dry weight of the non-wood biomass. The parenchymal cellulose content may be, for example, in a range of 10-80 weight-%, preferably 10-70 weight-%, more preferably 20-70 weight-% %, based on the dry weight of the non-wood biomass. According to one embodiment microfibrillated non-wood biomass is essentially free from cellulose structures originating from secondary cell walls.

The microfibrillated non-wood biomass comprises at least 5 weight-%, preferably at least 10 weight-%, more preferably at least 12.5 weight-%, of a hemicellulose fraction and/or pectin, calculated from the dry weight of the microfibrillated non-wood biomass. Hemicelluloses are here understood as short chain polysaccharides, with a preferable degree of polymerisation in a range of 50-250. Hemicelluloses comprise $\beta$-$(1\rightarrow4)$-linked backbones of glucose, mannose or xylose linked in equatorial configuration. It is assumed that the presence of relatively high amount of hemicelluloses and optional pectin positively affects the barrier properties. According to one preferable embodiment the microfibrillated non-wood biomass may comprise hemicellulose fraction in amount of 8-25 weight-%, preferably 8-20 weight-%, preferably 8-15 weight-%, and/or pectin in amount of 1-15 weight-%, preferably 1-10 weight-%, more preferably 1-8 weight-%, calculated from the dry weight of the non-wood biomass.

According to one embodiment the hemicellulose fraction of microfibrillated non-wood biomass comprises less than 10 weight-%, preferably less than 7 weight-%, more preferably less than 5 weight-%, of methylglucuronoxylans, arabinomethylglucuronoxylans or galactoglucomannans, calculated from the total dry weight of the hemicellulose fraction. The hemicellulose fraction may comprise, for example, arabinogalactan, arabinoxylan, arabinoglucuronoxylan, xyloglucan or any combinations thereof. The amount of xylan, arabinan, galactan, mannan in the hemicellulose fraction generally describe the structure of hemicelluloses present in the hemicellulose fraction of the microfibrillated non-wood biomass. The hemicellulose fraction may comprise 1-5 weight-%, preferably 2-4 weight-% of xylan; 2-20 weight-%, preferably 3-8 weight-% or 3-6 weight-% of arabinan, 0.5-2 weight-%, preferably 1-1.75 weight-% of galactan; and/or 1-3 weight-%, preferably 1.5-2.5 weight-% of mannan, calculated from total dry weight of the microfibrillated non-wood biomass.

The microfibrillated non-wood biomass may further comprise 0.5-12 weight-%, preferably 1-12 weight-%, more preferably 1-8 weight-% of lignin, calculated from the dry weight of the non-wood biomass.

The coating composition further preferably comprises an auxiliary agent comprising at least one cellulose derivative. The coating composition may comprise—10-55 weight-%, preferably 15-35 weight-%, more preferably 15-25 weight-%, of the auxiliary agent, calculated from dry solids content of the composition. The presence of cellulose derivate increases the amount of the bio-based components in the coating composition even further. It has been observed that the cellulose derivative improves the ductility of the obtained barrier coating layer, which means that the barrier layer does not easily crack at creasing or folding of the substrate.

According to one preferable embodiment the cellulose derivative, which is suitable for use as an auxiliary agent, is selected from water-soluble cellulose ethers and their mixtures. In general, the suitable cellulose ethers are water-soluble, at least in cold water (+15° C.). The cellulose ether may be selected from alkyl celluloses, hydroxyalkyl celluloses, hydroxyalkyl alkyl celluloses or any of their mixtures. The cellulose ether may contain one or several alkyl and/or hydroxyalkyl groups, which may be same or different from each other. Suitable alkyl groups are, for example, methyl, ethyl and propyl. Suitable hydroxyalkyl groups are, for example, hydroxymethyl, hydroxyethyl and hydroxypropyl. The cellulose ether may have a degree of substitution, DS, of the alkyl and hydroxyalkyl groups in a range of 0.1-3, preferably 0.5-2.7, more preferably 0.7-2.5, even more preferably 1.0-2.1.

It is possible that the cellulose ether may even comprise other functional groups in addition to alkyl, hydroxyalkyl and hydroxyl groups. The other groups may be selected, for example, from carboxylate, carboxyalkyl, sulphonate, phosphonate, amine, amide, and alkyl ester groups. If the cellulose ether comprises one or more other groups in addition to alkyl and/or hydroxyalkyl groups, the degree of substitution of the alkyl and/or hydroxyalkyl groups is higher than the degree of substitution of the other groups.

According to one preferable embodiment the cellulose ether, which is used as an auxiliary agent, is selected from alkyl celluloses, hydroxyalkyl celluloses, hydroxyalkyl alkyl celluloses and any of their mixtures. For example, the cellulose ether may be selected from a group consisting of methyl cellulose, ethyl cellulose, hydroxymethyl cellulose, hydroxyethyl cellulose, hydroxypropyl cellulose, (hydroxyethyl)methyl cellulose and (hydroxypropyl)methyl cellulose and any mixtures thereof. Preferably the cellulose ether is methyl cellulose, (hydroxypropyl)methyl cellulose or hydroxyethyl cellulose, more preferably hydroxyethyl cellulose. The use of cellulose ether as an auxiliary agent may improve the rheological and film forming properties of the coating composition, thus making it easier to apply on the surface of the substrate to be coated.

The cellulose derivative, preferably cellulose ether, which is suitable for use in the present invention, may have a weight average molecular weight ≤150 000 g/mol, preferably ≤100 000 g/mol, more preferably ≤45 000 g/mol, even more preferably ≤20 000 g/mol. The weight average molecular weight of the cellulose derivative may be in a range of 1000-150 000 g/mol, preferably 2000-100 000 g/mol, more preferably 3000-45 000 g/mol or even more preferably 5 000-20 000 g/mol. Sometimes the weight average molecular weight of the cellulose derivative may be in a range of 5 000-15 000 g/mol. In some embodiments, the molecular weight of the cellulose derivative may have advantageous effect on the viscosity properties of the coating composition and its solid content.

In addition, the coating composition preferably comprises a synthetic binding agent, such as polyvinyl alcohol or polystyrene acrylate copolymer. The amount of synthetic binding agent in the coating composition may be 20-60 weight-%, preferably 25-50 weight-%, more preferably 25-35 weight-%, calculated from dry solids content of the composition. The amount of synthetic binding agent can be reduced and it is still possible to obtain appropriate barrier properties.

According to one preferable embodiment the synthetic binding agent may be polyvinyl alcohol. The weight average molecular weight of the polyvinyl alcohol may be <100 000 g/mol, preferably <90 000 g/mol, more preferably <80 000 g/mol. Polyvinyl alcohol that is especially suitable for use as a synthetic binding agent may have a weight average molecular weight of ≤70 000 g/mol, preferably. The weight average molecular weight may be in a range from 13 000-70 000 g/mol, preferably 13 000-50 000 g/mol, even more preferably 15 000-50 000 g/mol. In general the polyvinyl alcohol with small weight average molecular weight is preferable, as it improve the properties of the obtained coating layer. The polyvinyl alcohol may preferably be at least partially hydrolysed, more preferably with a hydrolysis degree of at least 50%, more preferably at least 70%, even more preferably at least 85%. The preferable hydrolysis degree may be, for example, 85-98%. Polyvinyl alcohol, when used as a synthetic binding agent, may improve the film formation and the barrier properties of the obtained coating layer. Polyvinyl alcohol may also reduce blocking tendency of the obtained coating layer.

According to other preferable embodiment the synthetic binding agent may be a styrene (meth)acrylate copolymer. The styrene (meth)acrylate copolymer may be obtained by free radical copolymerisation of at least monomer (a), monomer (b) and an optional monomer (c) in the presence of a stabiliser, wherein the monomer (a) is at least one optionally substituted styrene and the monomer (b) is at least one C1-C4-alkyl (meth)acrylate. The monomer (a) is selected from group comprising styrene, substituted styrenes, such as α-methylstyrene, vinyltoluene, ethylvinyltoluene, chloromethylstyrene, and any mixtures thereof. The amount of monomer (a) may be 0.1-75 weight-%, preferably 5-60 weight-%, more preferably 10-55 weight-%, calculated from the total dry solids content of the monomers (a), (b) and optional (c). The monomer (b) may be selected from group consisting of C1-C4-alkyl acrylates; C1-C4-alkyl methacrylates; or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferred embodiment the monomer (b) is selected from butyl (meth)acrylates, such as n-butyl acrylate, tert-butyl acrylate or their mixtures. The amount of monomer (b) may be 25-99.9 weight-%, preferably 30-95 weight-%, more preferably 35-90 weight-%, calculated from the total dry solids content of the monomers (a), (b) and optional (c).

The styrene (meth)acrylate copolymer may comprise also at least one monomer (c), which is ethylenically unsaturated and different from the monomers (a) and (b). The monomer (c) may be selected, for example, from carboxylic acid, such as acrylic acid, methacrylic acid, itaconic acid, maleic acid or styrene sulphonic acid. Acrylic acid and styrene sulphonic acid are being preferred. The amount of the optional monomer (c) may be 0.1-15 weight-%, preferably 0.1-10 weight-%, more preferably 1-5 weight-%, calculated from the total dry solids content of the monomers (a), (b) and (c).

The styrene (meth)acrylate copolymer, which may be used as a synthetic binder, is preferably obtained by polymerisation in the presence of a stabiliser, which is degraded starch. Preferably the degraded starch has an average molecular weight $M_n$ of 500 to 10 000. Degraded starch may be obtained by subjecting starch to oxidative, thermal, acidic, hydrolytic or enzymatic degradation, the oxidative degradation presently being preferred. Hypochlorite, peroxodisulphate, hydrogen peroxide or their mixtures may be used as oxidising agents. Degraded starch, which is used in the polymerisation of styrene (meth)acylate copolymer may be any suitable degraded natural starch, such as potato, rice, corn, waxy corn, wheat, barley or tapioca starch. Starches having an amylopectin content >80%, preferably >95%, are advantageous.

According to one preferable embodiment the styrene (meth)acrylate copolymer, which is used as the synthetic binding agent, may have a glass transition temperature in the range from −40 to +20° C., more preferably from −30 to +15° C., even more preferably from −20 to +10° C. The copolymers with a glass transition temperature within these ranges are able to create a coating composition which provides good barrier properties as well as a coating layer with good ductility, which is able to withstand cracking when the substrate is creased or folded.

The styrene (meth)acrylate copolymer, which is used as the synthetic binding agent, may have a weight average molecular weight <300 000 g/mol, preferably <250 000 g/mol more preferably <100 000 g/mol, even more preferably <75 000 g/mol. According to one embodiment the weight average weight of the styrene (meth)acrylate copolymer may be in a range of 5000-300 000 g/mol, preferably 5000-250 000 g/mol or 5000-200 000 g/mol, more preferably 5000-100 000 g/mol, or even more preferably 7500-75 000 g/mol, sometimes more preferably 10 000-70 000 g/mol.

The coating composition may further comprise inorganic mineral particles, preferably selected from particles of kaolin, talc, calcium carbonate or any mixture thereof. The particle size D50 of the inorganic mineral particles may be <5 µm, preferably at least 45% of the inorganic mineral particles has a particle size <2 µm. According to one embodiment of the invention the coating composition may preferably comprise platy inorganic mineral particles having a form factor >10. Typical examples of platy inorganic mineral particles are kaolin, talc and any of their mixtures. It has been observed that the addition of inorganic mineral particles to the coating composition may further improve the obtained barrier properties, especially when platy inorganic mineral particles are used. The coating composition may comprise ≤35 weight-%, preferably ≤30 weight-%, more preferably ≤25 weight-%, sometimes even ≤20 weight-%, of inorganic mineral particles. The amount of inorganic mineral particles may be, for example, in the range of 0.1-30 weight-%, preferably 0.1-27 weight-%, preferably 0.1-25 weight-%, calculated from the total dry weight of the coating composition. According to one embodiment the amount of inorganic mineral particles in the coating composition may be 0.1-10 weight-%, preferably 0.1-5 weight-%, calculated from the total dry weight of the coating composition.

According to one preferable embodiment of the present invention the coating composition is free of inorganic mineral particles.

The coating composition may further comprise other additives which are conventionally used in coating compositions for providing barrier properties. Suitable additives are, for example, various plasticizers, cross-linkers, cosolvents or any combinations thereof.

The coating composition of the present invention is used for providing barrier properties for a substrate comprising cellulosic and/or lignocellulosic fibres, such as paper, board or the like. The cellulosic or lignocellulosic fibres may have been obtained by any conventional pulping process, including chemical, mechanical, chemi-mechanical pulping processes. The substrate may also comprise or consist of recycled fibres. The sheet-like substrate has a first and a second large surface, parallel with each other, and it is usually in form of a fibrous web. The substrate may have a grammage of 25-800 g/m², preferably 30-700 g/m², more preferably 40-500 g/m².

The coating composition may be applied at least one the surfaces of the substrate. The coating composition may be applied by using any conventional coating technique, such as rod coating, blade coating, spray coating or curtain coating in order to form a barrier coating layer. Alternatively the coating composition may be applied by using any conventional surface sizing apparatus, such as pond size presses, film size presses or gate-roll size presses in order to form a barrier coating layer. It is also possible to apply the coating composition on a wet web, for example by spraying. The coating composition may be applied by spraying after the wire section and before the press section of the paper or board machine, where the solid content of the web is typically at least 10-15 weight-%, for example 12-30 weight-% or 15-25 weight-%. The barrier coating layer may have a maximum weight of 10 g/m², preferably maximum weight of 5 g/m². The barrier coating layer may have a weight in a range of 0.5-10 g/m², preferably 1-5 g/m². According to another embodiment the barrier coating layer may have a weight in a range of 3-15 g/m².

The coating composition may be applied on the surface of the substrate as a one single layer or it may be applied in successive layers.

The coating composition is in form of an aqueous dispersion. The coating composition may have a solids content of 1-30 weight-%.

According to one embodiment of the invention the obtained product may have a water vapour barrier WVTR value <30 g/m²/d, preferably <20 g/m²/d. Water vapour barrier WVTR value is an indicator of how easily moisture can permeate a packaging film, and the values are determined according to standard ASTM F1249.

The sheet-like product coated with the coating composition of the present invention can be used for foodservice packages or for liquid packaging. Typical examples of foodservice packages are packages for fast food, ready-to-eat meals, sandwiches, bakery products, such as cookies, doughnuts, or the like.

EXPERIMENTAL

An embodiment of the invention is described in the following non-limiting example.

Example 1

Various coating compositions comprising microfibrillated non-wood biomass were tested for their barrier properties.

The following components were used in the coating compositions:

cellulose ether selected from hydroxyethyl cellulose (HEC), methyl hydroxyethyl cellulose (MHEC), methyl cellulose (MC) or (hydroxypropyl)methyl cellulose (HPMC) as cellulose derivative;

microfibrillated non-wood biomass, v-MFC, originating from sugar beet harvest residues, fibrillated with a mechanical refiner. v-MFC had a hemicellulose content of 10 weight-% (xylan, arabinan, mannan), pectin content of 2 weight-% and lignin content of 8 weight-%, calculated from the dry weight of the microfibrillated non-wood biomass. Particle size D90 for v-MFC was 122 µm and particle size D50 was 50 µm. Prior to use, 20 weight-% v-MFC was diluted to 2-3 weight-% concentration with tap water and mixed vigorously for 20 minutes by a Diaf dissolver for reactivation of the microfibrillated biomass;

polyvinyl alcohol, PVA, hydrolysis degree 98.4%, molecular weight about 47 000 g/mol;

carboxymethyl cellulose, CMC, DS 0.4, about 400 000 g/mol, dissolved in 50° C. at 1% conc. for 60 min (dispersing auxiliary agent); and cellulose ether in the coating compositions together with the microfibrillated non-wood cellulose unexpectedly improved both barrier performance, expressed as WVTR and OTR values obtained (C-3 to C-6). It is further seen that the barrier results are not significantly affected by the choice of the cellulose ether type.

TABLE 1

| | | | | | | | | | | | |
|---|---|---|---|---|---|---|---|---|---|---|---|
| Results of Example 1. | | | | | | | | | | | |
| Component | Ref-1 | Ref-2 | Ref-3 | Ref-4 | Ref-5 | C-1 | C-2 | C-3 | C-4 | C-5 | C-6 |
| V-MFC | | 100 | | | | 35 | 50 | 45 | 45 | 45 | 45 |
| W-MFC | 100 | | | | | | | | | | |
| PVA | | | 100 | | | 20 | | 10 | 10 | 10 | 10 |
| CMC | | | | | | | | 10 | 10 | 10 | 10 |
| SA polymer | | | | | | 45 | 50 | 20 | 20 | 20 | 20 |
| HEC | | | | 100 | | | | 15 | | | |
| MC | | | | | | | | | 15 | | |
| HPMC | | | | | | | | | | 15 | |
| MHEC | | | | | 100 | | | | | | 15 |
| viscosity | | | | | | 860 | — | 1500 | 1420 | 1060 | 2500 |
| solids content | | | | | | 3.6 | — | 2.7 | 2.6 | 2.5 | 3.7 |
| WVTR | 73.8 | 59.1 | 4.0 | 65.4 | 85.4 | 15.8 | 43.4 | 29.7 | 32.9 | 32.6 | 26.6 |
| OTR ccm2/d | | | | | | 95.3 | | 6.92 | 4.65 | 5.27 | 2.9 | styrene acrylate copolymer, obtained by polymerising styrene and acrylate monomers in presence of degraded starch, copolymer having glass transition temperature about 9 and weight average molecular weight about 277 000 g/mol.

Coating compositions were prepared by adding the components of the coating composition to the diluted microfibrillated non-wood biomass dispersion in the following order: cellulose ether, PVA, CMC, and synthetic polymer. The amounts are given in Table 1. The coating composition was mixed during the addition of individual components with a moderate mixing speed in order to avoid formation of the air bubbles.

Viscosity of the obtained coating compositions were measured by using Brookfield DV-E viscometer, 50 rpm, at 25° C. Spindle 4 was used for coating composition C-6, spindle 6 for all other coating compositions. Solids content of the coating compositions are given in Table 1.

As a reference were used compositions consisting of 100% commercial microfibrillated wood cellulose from softwood, w-MFC (Ref-1); 100% microfibrillated non-wood biomass, v-MFC (Ref-2); 100% polyvinyl alcohol PVA (Ref-3), 100% hydroxyethyl cellulose HEC (Ref-4) and 100% methyl hydroxyethyl cellulose MHEC (Ref-5).

Iron cast blade was used in thin film drawing, and films were casted on a transparency film. Cast films were let to dry freely in ambient conditions and on a flat surface. Drying took time from one to three days depending on the original wet film thickness. Flexible films were obtained.

The obtained films visually evaluated. Water vapor barrier properties of the films were measured using Systech Permeation Analyzer M7002 and Oxygen transmission rate, OTR values, were measured by using Model M8001 Oxygen Permeation Analyzer. The results are given in Table 1.

It can be seen from Table 1 that the water vapour and oxygen barrier properties obtainable by coating compositions comprising microfibrillated non-wood biomass may be significantly improved when the coating composition comprises a synthetic binding agent (C-1, C2). Use of these components enable decrease of synthetic polymers in the coating compositions, while keeping the barrier properties on an acceptable level. Furthermore, it is seen that the use of Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A coating composition for providing barrier properties for a cellulosic fibre web, wherein the coating composition is in a form of an aqueous dispersion having a solids content of 1-30 weight-%, the coating composition comprising:

20-60 weight-% of microfibrillated non-wood biomass, having a particle size D90<250 µm and a particle size D50<100 µm, which microfibrillated non-wood biomass comprises at least 5 weight-% of a hemicellulose fraction and/or pectin, calculated from a dry weight of the microfibrillated non-wood biomass;

10-55 weight-% of an auxiliary agent comprising at least one cellulose derivative selected from water-soluble cellulose ethers selected from the group consisting of alkyl celluloses, hydroxyalkyl celluloses, hydroxyalkyl alkyl celluloses and any of their mixtures; and 20-60 weight-% of a synthetic binding agent selected from, polyvinyl alcohol or polystyrene (meth)acrylate copolymer.

2. The coating composition according to claim 1, wherein the coating composition comprises:

30-55 weight-% of the microfibrillated non-wood biomass; and/or 15-35 weight-% of the auxiliary agent; and/or 25-50 weight-% of the synthetic binding agent.

3. The coating composition according to claim 1 wherein the microfibrillated non-wood biomass comprises:

8-25 weight-% of hemicellulose fraction;

0.5-12 weight-% of lignin; and/or 1-15 weight-% of pectin, calculated from the dry weight of the microfibrillated non-wood biomass.

4. The coating composition according to claim 1, wherein the hemicellulose fraction of the microfibrillated non-wood biomass comprises:

1-5 weight-% of xylan;

2-20 weight-% of arabinan; and/or 1-3 weight-% of mannan, calculated from the dry weight of the microfibrillated non-wood biomass.

5. The coating composition according to claim 1, wherein the microfibrillated non-wood biomass originates from vegetables, fruits, grasses, cereals, pseudocereals, legumes or any combination thereof.

6. The coating composition according to claim 1, wherein the at least one cellulose derivative has a weight average molecular weight ≤150 000 g/mol.

7. The coating composition according to claim 1, wherein the synthetic binding agent is styrene (meth)acrylate copolymer having a glass transition temperature in a range from −40 to +20° C., and/or a weight average molecular weight <100 000 g/mol.

8. The coating composition according to claim 1, wherein the polyvinyl alcohol has a molecular weight of ≤70 000 g/mol.

9. A sheet-like product comprising a substrate comprising lignocellulosic and/or cellulosic fibres, and having a first and second parallel large surface; and a barrier coating layer formed with the coating composition according to claim 1 applied on at least one of the first and second surfaces of the substrate.

10. The sheet-like product according to claim 9, wherein the substrate has a grammage of 25-800 g/m².

11. The sheet-like product according to claim 9 wherein the barrier coating layer has a maximum weight of 10 g/m².

12. The sheet-like product according to claim 9, wherein the sheet-like product has a water vapour barrier WVTR value <30 g/m²/d.

* * * * *